United States Patent [19]

Stoll

[11] Patent Number: 4,715,264

[45] Date of Patent: Dec. 29, 1987

[54] PISTON AND CYLINDER UNIT

[76] Inventor: Kurt Stoll, Lenzhalde 72, 7300 Esslingen, Fed. Rep. of Germany

[21] Appl. No.: 832,475

[22] Filed: Feb. 20, 1986

[30] Foreign Application Priority Data

Feb. 22, 1985 [DE] Fed. Rep. of Germany ....... 3506180

[51] Int. Cl.⁴ .................... F01B 25/02; F15B 13/04
[52] U.S. Cl. ................................ 91/16; 91/20; 91/27; 91/31; 91/410; 251/129.02
[58] Field of Search .................. 91/16, 19, 20, 24, 27, 91/31, 32, 410, 419, DIG. 4; 251/122, 129.02, 129.15

[56] References Cited

U.S. PATENT DOCUMENTS

| | | | |
|---|---|---|---|
| 1,734,095 | 11/1929 | Mancib | 251/122 X |
| 2,685,276 | 8/1954 | Dyken | 91/31 |
| 3,420,141 | 1/1969 | Hague et al. | 91/27 X |
| 3,771,802 | 11/1973 | Hiramatu et al. | 91/31 X |
| 4,121,618 | 10/1978 | Sweeney | 91/410 X |
| 4,176,586 | 12/1979 | Stoll et al. | 91/DIG. 4 X |
| 4,335,867 | 6/1982 | Bihlmaier | 91/31 X |
| 4,378,726 | 4/1983 | Stoll | 91/DIG. 4 X |

FOREIGN PATENT DOCUMENTS

561802 6/1944 United Kingdom .
2120813 7/1983 United Kingdom .

*Primary Examiner*—Robert E. Garrett
*Assistant Examiner*—Mark A. Williamson
*Attorney, Agent, or Firm*—McGlew and Tuttle

[57] ABSTRACT

The invention relates to piston and cylinder unit with a regulating valve for controlling the speed of the piston. The regulating valve has an open position in which it allows free passage of a fluid to the piston and a choking position in which it reduces the rate of such flow for influencing the speed of the piston. Furthermore there is at least one sensor responding to a given position of the piston and designed to change over the setting of the regulating valve. The sensor is an inductive, electrical or magnetic contactless sensor. The regulating valve has a setting unit electrically operated by the regulating valve so that the regulating valve is switched between its open and choked positions.

9 Claims, 3 Drawing Figures

PISTON AND CYLINDER UNIT

BACKGROUND OF THE INVENTION

The invention relates to a piston and cylinder unit having a valve which serves to regulate the piston speed and has an open position in which it allows free flow of driving fluid to the piston and a choking position in which it chokes the flow of the driving fluid in order to influence the piston speed, the regulating valve further being connected with at least one sensor responding to a given piston setting and then changing the valve setting.

Such piston and cylinder units are employed to change the speed of the moving piston in a way dependent on its instantaneous position. Fields of application are for instance in connection with buffering the end of the piston stroke when approaching its terminal position, as for example in robots and materials handling equipment. The operation of the regulating valve controlling the supply of fluid to the cylinder and therefore at the same time changing the speed of the piston takes place mechanically using a cam follower or similar sensing member on the valve member to sense a cam rail, on which the follower runs. In accordance with the geometry of the cam rail, the regulating valve is opened to a greater or lesser extent. A disadvantage in the case of such a design of piston and cylinder unit is that it takes up a large amount of space, since the regulating valve has to be located right on the cylinder or in the direct vicinity thereof. Equipment having to be fitted with a large number of such piston and cylinder units as for example industrial robots is therefore so bulky that its applications become very limited. Furthermore, such a mechanical following mechanism has a high wear rate and the length of life of the cylinder is seriously limited by the irregular loading on the piston rod when the regulating valve is actuated. In particular, the bushings or the like on which the piston rod runs in the cylinder are heavily loaded so that the piston rod may run skew and then seize up.

SHORT SUMMARY OF THE PRESENT INVENTION

In order to remedy these disadvantages of the prior art, one object of the invention is to devise a piston and cylinder unit of the type initially specified, which despite the means for controlling piston speed with a speed regulating valve, may be employed where only a limited amount of space is available.

A further object of the invention is to design such a piston and cylinder unit in which the rate of wear of the piston rod, of the piston and of the cylinder is cut down.

In order to achieve these or other objects of the invention appearing in the course of the present specification, the sensor is a contactless inductive, electrical or magnetic sensor and the regulating valve possesses a setting unit to be electrically operated by the sensor and adapted to switch the regulating valve between an open position and a choking position thereof. It will be seen that there is the consequent advantage that the valve regulating the piston speed may be placed completely separate from the cylinder actuator itself at any desired distance therefrom. The connection between the sensor causing the operation of the valve and the regulating valve itself may be via electrical leads which may be readily placed where needed without difficulty and without taking up a large amount of space. It is only the sensor that has to remain in the vicinity of the cylinder and its overall size is so small that the dimensions of the cylinder itself are only insubstantially increased by this addition to it. As a result there is more particularly the possibility of fitting the piston and cylinder unit of the invention to equipment which is not to exceed a certain space requirement and which would not be sufficient for accommodating a normal speed regulating valve. This advantage is more especially telling if a number of such piston and cylinder units are to be accommodated in a very small space. Owing to the possibility of arranging the regulating valve externally there is at the same time the possibility of making a better check on its operation. Furthermore the arrangement in accordance with the invention makes for a substantial reduction in wear owing the contactless operation of the sensor. Despite the use of a speed regulating valve there is no greater wear of the cylinder, piston and piston rod than is the case with actuators without such a valve; the working life of the piston and cylinder unit in accordance with the invention is substantially longer than with the known arrangements. Furthermore there is a reduction in the rate of wear of the speed regulating valve itself, since its operation is contactless owing to the use of the electromagnetic setting unit.

In accordance with a preferred feature of the invention at least one part of the piston is fashioned of permanently magnetic material or the piston is furnished with a permanently magnetic insert and the sensor is so fitted on the outer periphery of the cylinder that when the piston moves past it its permanently magnetic part is radially opposite thereto. The sensor may be a reed or inductive switch. These further developments of the invention ensure reliable function and accurate switching by the sensor.

In accordance with a further development of the invention the regulating valve possesses an externally set, stepless choke, which in the choked condition of the regulating valve reduces the rate of flow of the fluid acting on the piston. The unit may have a first duct for conducting fluid to the cylinder and the choke may have a valve member extending to a greater or less extent into the first duct in the choked condition of the regulating valve so that the flow of the fluid is checked a proportionate amount. The extent to which the valve member extends into the duct in the choking condition of the regulating valve may be set from the outside.

These features provide a simple way of presetting the piston speed when the regulating valve is actuated and when the regulating valve is in its choking condition. There is thus the possibility of preprogramming different piston speeds and of remote control using an electrical pulse. Even during the choked speed of the piston it is possible to carry out resetting of the fluid flow rate as set by the choke.

In accordance with a further preferred feature of the invention the choke or the valve member is able to be operated by the electrically operated setting unit. The regulating valve may be a 2-way valve and the valve member may have a conical form tapering in the direction of extension into the first duct. It is possible to have an externally adjusted abutment or stop for presetting the amount of extension of the valve member into the duct in the choked condition of the regulating valve. The valve member may be a part of a valve member which cooperates with an abutment on the housing or the valve housing itself.

These further possible developments of the invention make it possible for the valve to be made with a simple but at the same time compact construction. Despite the use of an electromagnetically operated setting unit, which as a rule only makes it possible to set a valve member between two extreme positions, a variable choking effect on the flow responsible for advancing the piston is possible. These features furthermore relate to designs that are very simple to produce and which at the same time allow the position of the choke setting to be simply adjusted at any time from the outside.

In accordance with a further preferred feature of the invention the regulating valve comprises a second duct connected with the first duct and its choke. The second duct is supplied from the same source of fluid under pressure as the first one and has a shut off valve placed in it which may be opened and shut via the electrical operating setting unit in such a way that the fluid flows to the piston or cylinder in the opened position of the regulating valve through the shut off valve and in the choked condition flows through the choke.

This form of the invention relates to a further development which is characterized by a particularly low rate of wear and by a low cost of production. There is the possibility of designing the valve member of the shut off valve in the form of a simple sealing plate only able to move between an open and a sut position. In the closed condition the flow is via the choke functioning as a bypass, whose rate may be controlled for instance by a valve member in the form of a choke screw. In the open setting of the shut off valve the flow is through it as well, since it offers a lower resistance to flow than the choke.

As a further possible feature of the invention the setting unit is electromagnetically operated and comprises an electromagnet operating the shut off valve or the choke. This further optional feature of the invention makes possible a simple and low-price design of the regulating valve and is furthermore highly economical in the use of space. At the same time the switching cycle of the regulating valve is minimized so that the piston and cylinder unit of the invention has a very short response time making possible a rapid switching over from full speed to inching speed.

The invention will now be described on the basis of the accompanying drawings showing only two of many possible embodiments of a piston and cylinder unit.

LIST OF THE SEVERAL VIEWS OF THE DRAWINGS.

DETAILED ACCOUNT OF WORKING EXAMPLES OF THE INVENTION

Figure 1:
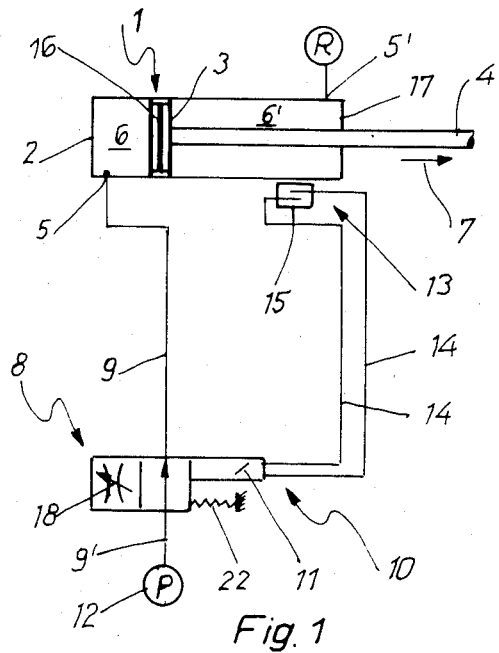
FIG. 1 is a circuit diagram of a first embodiment of the piston and cylinder unit of the invention.

The main features of the piston and cylinder unit of the invention will be described referring firstly to FIG. 1. It will be seen that it comprises an actuator 1 whose chief parts are a cylinder 2, a piston 3 and a piston rod 4. At each of the ends of the cylinder there is a connection port 5 and 5′ for a pressure line or the like so that fluid may be admitted to and let off from the cylinder. FIG. 1 shows a position in which the front cylinder chamber 6 (i. e. the chamber in which there is no piston rod) is connected via the respective connector port 5 for the supplying of driving fluid and in which the rear cylinder chamber 6′ (the chamber surrounding the piston rod 4) is connected via the connection port 5′ for the release of fluid (in the present case air) from it. This connection port 5′ is therefore referenced R. The piston 3 and the piston rod 4 accordingly move in the direction of the arrow 7 to the right and away from the connection port 5. It will be clear that the supply and discharge of the fluid may take place the other way round in order to reverse the direction of motion of the piston and the piston rod. However, to make the present description more straightforward there is no account of this possibility in the ensuing description of the piston and cylinder unit of the invention.

The front cylinder chamber 6 is connected via the connection port 5 and a pressure line 9 with a valve 8 for regulation of the speed of the piston 3. This regulating valve 8 is in the form of a 2 way valve that may be operated by an electrically operated setting unit 10. This setting unit 10 may be an electric motor, or, as in the present preferred case of FIG. 1, it may comprise a solenoid 11 or electromagnet. The 2 way regulating valve 8 is able to be reciprocated between an open position, in which it allows the flow of fluid from a pressure source 12 also marked P without any hindrance and a choked position, in which it chokes the flow of the fluid for reducing the piston speed. FIG. 1 shows the open position in which the fluid from the pressure source 12 passes via a pressure fluid line 9′ and the regulating valve 8 and then is able to pass along the pressure line 9 to the connection port 5 accessing the front cylinder chamber 6.

The electrically operated setting unit 10 is connected with a contactless sensor 13, as for example via electrical leads 14, and when the sensor is operated it produces a pulse for the operation of the setting unit. The sensor 13 may be more especially designed for inductive, electrical or magnetic operation, the arrangement of FIG. 1 being contrived for magnetic actuation. In this case the sensor 13 comprises a reed switch 15 whose contacts are closed for the creation of a pulse when a magnetic field is moved towards the switch 15. In FIG. 1 the magnetic field is produced by an annular permanent magnet 16 set in the outer periphery of the piston 3 and which is reciprocated with the piston 3. Preferably the sensor 13 with the reed switch 15 is fitted to the outer face of the cylinder 2 and is operated when the field of the permanent magnet 16 passes its signal generating position. Preferably, the sensor 13 is mounted on the cylinder 2 so that it may be adjusted in its axial direction and the position of switching may be reset. In the embodiment of the invention to be seen in FIG. 1 the sensor 13 is at a small axial distance from the end setting of the piston 3 as defined by the end 17 of the cylinder 2 with the piston rod extending through it so that the course of operation is as follows:

At the commencement of an operating cycle the piston and its rod are in the retracted position, in which it is near the connection port 5 to be seen on the left of FIG. 1. If now a fluid is admitted via the regulating valve 8 which is in the open setting, the piston 3 will shift at its maximum speed as marked by the arrow 7 towards the back cylinder end 17. At that instant at which the permanent magnet 16 fitted to the piston 3 is approximately radially opposite the sensor 13 fitted to the outer face of the cylinder 2, the sensor 13 is operated, which in turn operates the setting unit 10 which practically simultaneously moves the regulating valve 8 out of its open into its choked position or condition. In this choking position the flow of fluid from the pressure source 12 is choked by the choke 18 arranged in the regulating valve 8 so that the volumetric flow rate of the fluid into the cylinder chamber 6 is reduced. This results in a slowing down of the piston speed so that the piston 3 runs into its end position at a reduced speed, i. e. with a buffering of the end of stroke. To regulate the piston speed in the choked condition of the regulating valve 8 the choke 18 is made so that it may be adjusted to vary the cross section of the passage.

The embodiment of FIG. 1 is so designed that the sensor 13 functions more or less as a relay and the pulse produced by it when the magnet moves past the sensor operates a circuit in the setting unit 10 which causes the regulating valve 8 to be kept in its choked condition for a certain length of time. When this time has expired the regulating valve 8 is returned to its open position by a restoring spring 22. However, other designs are possible.

As an example it would be possible to have a further sensor (not illustrated) in addition to the sensor 13, in the end position of the piston such that when during its motion the piston moves past the first sensor 13 the regulating valve would be switched over into its choked condition and would remain in it until a further sensor, responsive to the end position of the piston 3, produces a further switching pulse, which for its part would cause the regulating valve 8 to be switched back. Furthermore in the case of a combined end-of-stroke and beginning-of-stroke buffering effect the operation of the regulating valve 8 might be such that in an arrangement as in FIG. 1 the regulating valve 8 would be switched into its choked condition the first time the sensor is passed by the piston, so that and end-of-stroke buffering effect would result, and that when the piston motion is then reversed there would firstly be initial motion at a slow speed until the piston reached the sensor a second time. It will be seen that in such form of the invention it would be necessary to provide further control valves (not shown) which on the one hand would connect the regulating valve 8 with the back cylinder chamber 6' after reaching the terminal position of the piston and on the other hand would at the same time connect the other cylinder chamber 6 with a vent port.

It remains to be noted that the embodiment and manner of arrangement of the permanent magnet 16 is naturally not limited to the example as described. In fact, it would more especially be possible to make the piston entirely of magnetic material or for only a part of it to be fashioned of such material. In this latter case, or for instance when using a small magnetic insert for example, it will be necessary to take steps to see that the piston is not able to turn about its axis so that the permanently magnetic part will be at the face of the bore of the cylinder 2 and directly adjacent to the sensor 13 when it moves past it.

Figure 2:
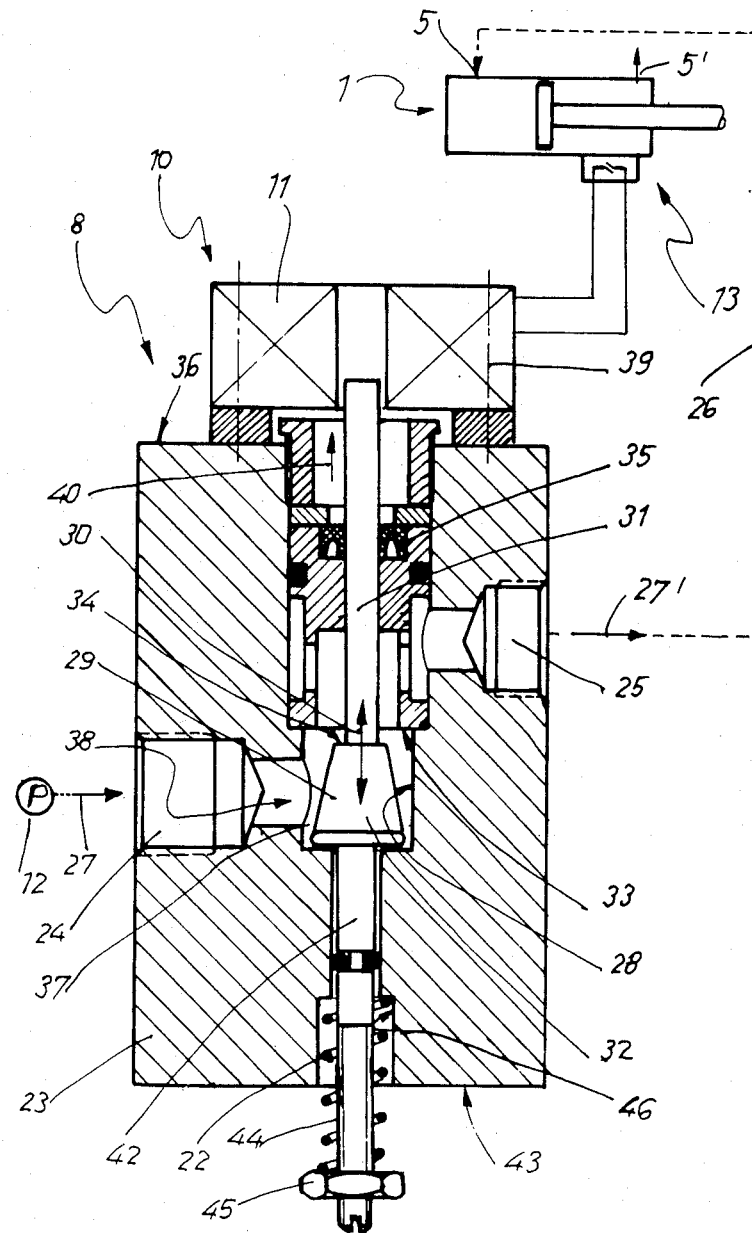
FIG. 2 shows a first form of the piston and cylinder unit of the invention.

FIG. 2 shows the piston and cylinder unit of FIG. 1 in more detail paying particular attention to an advantageous form of the regulating valve 8. Generally it will be seen that there is an actuator 1 with its components, the sensor 13 and the regulating valve 8. The regulating valve 8 possesses a housing 23 with an inlet port 24 for the fluid coming from the pressure source 12, with an outlet port 25 with which one of the connection ports 5 and 5' of the actuator 1 may be connected (see broken line 26). The arrows 27 and 27' indicate the direction of flow of the fluid. The housing 23 has a stepped duct or hole 28 passing through it axially and in this hole there is a valve member 29 which moves axially as indicated by the arrow 30. The valve member 29 has a plug member 32 cooperating with a valve seat 33 and which has a conical form and whose end face 34 with the smaller diameter is adjacent to the valve seat 33. A valve shank 31 is attached in some way to the end face 34 by some suitable method such as jointing, screwing or forming and the shank 31 runs in guides 35 coaxial to the hole 28 so that it may move in the axial direction with a sealing effect. At one of the ends 36 of the housing the valve shank 31 extends from the housing and into the electrically operated setting unit 10, which is fixed in place by diagrammatically indicated screws 39, The setting unit comprises a solenoid 11 as its main part.

The valve plug member 32 and the valve seat 33 are arranged in a valve chamber 37 with the two ports 24 and 25 opening into it so that a common duct is formed whose cross section depends on the amount by which the valve plug member 32 extends into the valve seat. The valve member 29 with the valve seat 33 forms a choke 38 for regulation of the rate of flow of fluid from the actuator 1.

There is a coaxial extension 42 of the valve shank 31 at the end 36 opposite to the end face 34 of the valve member 32. This extension 42 protrudes from the end face 43, opposite to the end 36, away from the housing 23. The free end 44 of this extension 42 is provided with a thread on which an adjustable stop 45 is screwed. Between this stop 45 and the housing 23 there is a return spring 22 mounted coaxially on the shank extension 42. It is best for the hole 28 to be counterbored at 46 for a certain distance from the end face 43 so that the return spring 22 is for some of its length received in the housing 23. The axial depth of the counterbore 46 is at least equal to the axial length of the return spring in its completely compressed condition and is preferably somewhat longer than this.

An account will now be given of the manner of operation of the regulating valve 8 to be seen in FIG. 2.

The regulating valve 8 is designed to be a normally open valve, that is to say in the unactuated condition the valve is held in its open condition by the return spring 22 which is located between the housing 23 and the stop 45. If now the sensor 13 is actuated (in the manner as described in connection with FIG. 1) a signal will be sent to the setting unit 10 so that its solenoid 11 will be activated and will move the valve member 29 in the direction of the arrow 40 so that at the same time the valve plug member 32 will be moved into the valve seat 33. The amount of such extension into the seat will be dependent on the setting of the adjustable stop 45, which may be set in the axial direction of the valve member. Accordingly the regulating valve 8 will be in its choked condition when the stop 45 has run up against the end face 43 of the housing. In this position the valve member is held by the solenoid 11. It will be seen from what has been said that the choked condition or setting of the regulating valve 8 may readily be set from outside steplessly and the depth of penetration of the valve plug member 32 may advantageously be reset by simple turning the stop 45 about its axis. The rate of flow of the fluid as determined by the choke 38 in its active setting may therefore be reset both in the open setting of the regulating valve 8 and also in its choked condition. It will be clear that the setting force exerted by the solenoid 11 exceeds the return force of of the return spring 22 in each of its positions in order to guarantee functional reliability.

A further embodiment of the invention (not illustrated) is so designed as to provide a possibility of setting the abutment device formed by the housing 23 and the stop 45 for presetting the depth of penetration of the valve plug member 32 in the choked condition of the regulating valve 8. In this case the stop is fixed in place and cooperates with a stop secured to the housing so that it may be adjusted in position.

Figure 3:
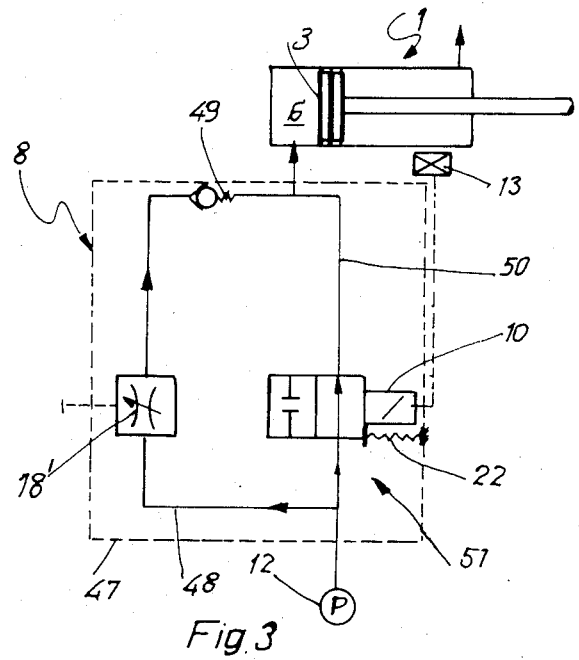
FIG. 3 is a schematic of a further working example of the piston and cylinder unit of the invention.

FIG. 3 diagrammatically shows a further embodiment of the piston and cylinder unit of the invention. The reader will again be able to see the actuator 1 with the sensor 13 fitted to it. The diagrammatically shown components enclosed by the broken line 47 constitute the regulating valve 8. Departing from the regulating valve 8 of FIGS. 1 and 2, in the present case the valve has a choke 18' in a first duct 48 extending from the source 12 of pressure to the actuator 1. The setting of the choke, that is to say the adjustment of the depth of penetration of the valve plug into the valve seat may be undertaken from the outside since the valve member is in the form of a choke screw designed for use with a suitable setting tool. Unlike the arrangement of FIGS. 1 and 2 the choke 18' does not cooperate with the setting unit 10 operated by the sensor 13. There is a check valve 49 placed downstream from the choke in the first duct 48 and this valve 49 along permits flow towards the actuator 1.

In addition to the first duct 48 the regulating valve 8 possesses a second duct 50, which is parallel to the first duct 48 and is supplied from the same pressure source 12 as it and furthermore opens into the same cylinder chamber 6 of the actuator 1 as it. In the second duct 50 there is a shut off valve 51 which may be opened and shut by an electrically operated setting unit 10 designed as described above in connection with the other embodiments of the invention.

The workings of the piston and cylinder unit of FIG. 3 are as follows.

At the commencement of a cycle the piston and the piston rod are in the retracted state and fluid from the pressure source 12 will make its way into the second duct 50 since the shut off valve 51 is opened. The fluid will take this path since it will have less resistance opposing it than on flowing through the choke 18' No reverse flow, which would be undesired, is possible since the check valve 49 is provided. When the piston 3 reaches the sensor 13 the result will be that the shut off valve 51 will be shut by the setting unit and this in turn will means that the fluid will now flow via the first duct 48 and the choke 18'. Dependent on the flow rate dictacted by the choke 18' the speed of the piston 3 will be changed. If the setting unit 10 comprises an electromagnet 11 the shut off valve 51 will be opened again after interruption of the supply of current to the electromagnet by the return spring 22.

I claim:

1. A piston and cylinder unit comprising a cylinder, a piston sliding in the cylinder, a piston rod attached to the piston, a regulating valve connected to said cylinder for controlling speed of motion of said piston in said cylinder, said regulating valve defining an open position to allow free passage therethrough of fluid for driving said unit and a choking position to choke the passage of fluid to said unit for the purpose of slowing down piston motion, at least one sensor designed to respond to a given position of said piston and to change the setting of said regulating valve following such response, said sensor being a contactless sensor and an electrically operated setting unit for operation of said regulating valve in response to a signal from said sensor for changing over said regulating valve between its open and choked positions, said regulating valve comprising a housing defining a first fluid duct for conducting fluid to said cylinder, said regulating valve further comprising a valve plug capable of extending into said duct to a greater or lesser extent for choking fluid flow to said cylinder, and externally accessible means for adjusting such depth of extension into said duct.

2. The piston and cylinder unit as claimed in claim 1 wherein at least a part of said piston is fashioned of permanently magnetic material, said sensor being so placed at an outer face of said cylinder that it is radially opposite said magnetic material when said piston moves past said sensor.

3. The piston and cylinder unit as claimed in claim 1 wherein said sensor comprises a sensitive element selected from the group consisting of: a reed switch, an inductive switch.

4. The piston and cylinder unit as claimed in claim 1 wherein said regulating valve is a 2 way valve.

5. The piston and cylinder unit as claimed in claim 1 wherein said valve plug has a conical form tapering into said first duct.

6. The piston and cylinder unit as claimed in claim 1 wherein said regulating valve comprises a valve member of which said plug forms part, said means comprising an adjustable stop on said valve member to cooperate with said a furthe rpart of regulating valve in defining the said choking position of said regulating valve.

7. The piston and cylinder unit as claimed in claim 1 wherein said valve is in the form of a normally open valve, said regulating valve being in an open position thereof when not actuated by said setting unit.

8. The piston and cylinder unit as claimed in claim 7 wherein said valve plug actuable by said setting unit is resiliently urged into an initial position thereof.

9. The piston and cylinder unit as claimed in claim 1 wherein said setting unit is electromagnetically operable and comprises a solenoid for operation of valve means.

* * * * *